United States Patent Office 2,758,118
Patented Aug. 7, 1956

2,758,118

PREPARATION OF 4,5-DIHYDRO-2-METHYLFURAN

Norman L. Hause, Grand Island, N. Y., assignor to E. I. du Pont de Nemours and Company, Wilmington, Del., a corporation of Delaware No Drawing. Application March 17, 1954, Serial No. 416,947

4 Claims. (Cl. 260—346.1)

This invention relates to the preparation of 4,5-dihydro-2-methylfuran by the dehydration of acetopropanol according to the equation:

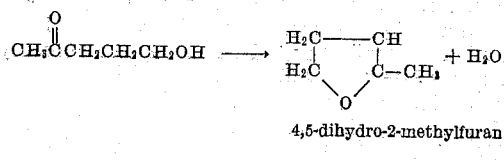

4,5-dihydro-2-methylfuran or

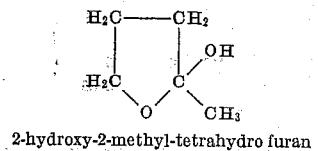

2-hydroxy-2-methyl-tetrahydro furan

This application is a continuation-in-part of copending application Serial Number 272,699, filed February 20, 1952, now abandoned.

Schniepp et al., J. A. C. S., 69, 672–674 (1947), reported the preparation of the above dihydromethylfuran in good yields by the dehydrative distillation of very small amounts of acetopropanol using a helices packed column. It has been found, however, that such a method gives highly erratic results, particularly when sizeable quantities of acetopropanol are distilled and it cannot be used as a practical production procedure. The reasons for these unreliable results of the prior art method are due to the fact that these earlier workers failed to realize the essential role of a suitable catalyst and further because the reaction mixture is sensitive to the reaction conditions in that side reactions leading to viscous dark colored by-products easily occur. Moreover, while I have discovered that the desired dehydration of acetopropanol is catalyzed by the presence of an acid, the reverse reaction, i. e., the hydration of 4,5-dihydro-2-methylfuran to acetopropanol, also occurs very readily in the presence of an acid.

It is an object of the invention to provide an improved method for the production of 4,5-dihydro-2-methylfuran from acetopropanol. A further object is to provide a more reliable method of producing this dihydromethylfuran by the dehydrative distillation of acetopropanol. Still further objects are the improvement of prior distillation methods and catalysts whereby consistently good conversions to the desired dihydromethylfuran can be readily obtained. Other objects will be apparent from the following description.

The above objects are accomplished in accordance with the invention by subjecting acetopropanol containing non-volatile acid catalyst to distillation conditions while continuously adding further amounts of acetopropanol to the body of liquid undergoing distillation at such a rate as will maintain that body at a substantially constant volume. It has been found that prolonged heating of acetopropanol during distillation is highly disadvantageous in that it increases the extent to which side reactions occur. By continuously adding fresh acetopropanol to the still so as to maintain the volume of liquid in the still substantially constant during the distillation, the time during which a unit amount of material is held at the temperatures necessary for distillation is minimized, thus reducing the conversion of acetopropanol to undesired by-products.

The volume of liquid to be maintained in the still pot during distillation may be varied considerably and usually will vary with the scale of operation, but should always be small compared with the total volume of the material to be distilled. Generally, the volume of liquid in the still to which further amounts of acetopropanol are added as distillation proceeds will not exceed about 30% of the total volume of acetopropanol which is to be distilled; preferably, it will be less than 20% e. g., on the order of 1–15%. When production is on a commercial scale the volume of acetopropanol in the still pot will generally be less than 1% of the volume to be distilled over a time unit of several hours. The rate of addition of acetopropanol during the distillation will approximate the rate at which dihydromethylfuran and water are distilled from the system.

Best results are obtained employing a distillation pot provided with an unpacked column through which the vapors of dihydromethylfuran and water are passed to the condenser. It has been found that use of an unpacked fractionating column is distinctly advantageous from the conversion standpoint over the use of a packed column. Preferably the unpacked column will be jacketed and heated, e. g., to a temperature in the range of 50 to 100° C. for most operations, and will have a length which is about 10–70, most preferably about 25–40, times its diameter, so as to avoid excessive hold up of vapors in the column, while providing effective condensation and return of acetopropanol to the still pot.

Dehydrative distillation of pure acetopropanol to 4,5-dihydro-2-methylfuran cannot be effected. Trace amounts of acid will catalyze the reaction. Large amounts of acid will cause excessive polymerization of the still pot charge. Therefore the amount of acid to be used as catalyst is highly critical. The use of volatile acids is undesirable since vapors of volatile acids catalyze recombination of dihydromethylfuran and water in the column and other parts of the distillation system. The acid used should of course not be one which reacts adversely with acetopropanol or dihydromethylfuran. The concentration of the non-volatile acid should be below about 0.5% of the weight of the body of liquid in the still pot during distillation. Larger amounts cause excessive polymerization to occur. The preferred concentrations are in the range 0.01 to 0.05% by weight. Examples of suitable non-volatile acids are phosphoric acid, sulfuric acid, stearic acid, sodium dihydrogen phosphate and sodium bisulfate. The use of phosphoric acid is preferred.

The method of the invention usually is most conveniently carried out at a pressure approximating atmospheric pressure although higher or lower pressures can be used. The use of higher pressures requires, of course, that the acetopropanol and the vaporous products be subjected to higher temperatures, which generally is disadvantageous and results in greater conversion to by-products. While good conversions can be realized at sub-atmospheric pressures, e. g., as low as around 1–250 mm. Hg, the dehydration reaction occurs more slowly under sub-atmospheric conditions in view of the lower temperatures involved. However, because of such lower temperatures, packed fractionating columns can be used with less disadvantage than when operating at atmospheric or higher pressures.

It is generally advantageous and advisable to add a small amount of a base such as an alkali or alkaline earth metal carbonate or bicarbonate to the distillate receiver to neutralize any acidic material that may be present. The amount of base to be used for this purpose is not critical and generally will be on the order of about 1–2% of the weight of the distillate to be collected.

There is a tendency for a dihydromethylfuran-acetopropanol addition product to be formed in the body of liquid undergoing distillation. It has been discovered that this tendency can be reduced and the conversion to 4,5-dihydro-2-methylfuran correspondingly increased by adding a small amount of water along with the acetopropanol to the body of liquid undergoing distillation, particularly towards the end of the distillation or when the rate of distillation decreases due to build up of such by-product in the still pot. Water so added appears to hydrolyze the by-product which has been formed and convert it back to acetopropanol which is then available for the desired dehydration reaction. An amount of water equal to about 1 to 30% of the weight of the acetopropanol being distilled is generally effective for this purpose, although larger or smaller amounts can be used with advantage.

The invention is illustrated by the following examples.

Example 1

About 50 ml. of a solution of 4 ml. of 0.3 N phosphoric acid in 300 g. (2.94 moles) of acetopropanol was placed in a 200 ml. three-necked flask set for distillation through a 1.5 x 45 cm. jacketed heated Vigreux column, the latter being preheated to 80° C. by means of an electrically heated jacket. When the temperature of the flask contents reached 175° C., the dehydration reaction began. The remainder of the acetopropanol-phosphoric acid solution was fed into the flask at approximately the rate at which the dihydromethylfuran and water were distilled at the column head so that the volume of liquid in the flask remained substantially constant. The head temperature remained between 85–97° C., while the temperature of the liquid in the flask rose slowly during the distillation from 175° C. to 195° C. After all of the acetopropanol solution (300 g.) had been added, the temperature of the residue in the flask climbed gradually to 260° C. A total of 212 g. of 4,5-dihydro-2-methylfuran, representing an 85% conversion, was collected during the four hour distillation period. About 26 g. of residue remained in the flask.

Example 2

Three hundred grams (2.94 moles) of acetopropanol containing 3 ml. of 0.3 N phosphoric acid, was distilled as described in Example 1 except that the material was all placed in the distillation flask at the start. In this case, the conversion to 4,5-dihydro-2-methylfuran was only 56% and the still residue was 86 g.

Example 3

Sixty g. (0.59 mole) of acetopropanol containing 0.75 ml. of 0.3 N phosphoric acid was distilled from a flask set for distillation through an asbestos-wrapped column having a 2.5 x 37 cm. section packed with berl saddles. No yield of 4,5-dihydro-2-methylfuran was obtained during a four hour period and substantially all of the material added remained in the flask as resinous or high boiling by-products, including perhaps some unconverted acetopropanol.

Example 4

The experiment of Example 3 was repeated except that the berl saddles were removed from the column. In this case, the amount of 4,5-dihydro-2-methylfuran obtained as distillate corresponded to a conversion of 65%.

Example 5

Five milliliters of 0.3 N prosphoric acid was added to 240 g. (2.37 moles) of acetopropanol and 50 ml. of the resulting solution was placed in a 500 ml. three-necked flask equipped with a thermometer and an addition funnel and set for distillation through a vacuum-jacketed, silver-lined column having a 1 x 36-inch section packed with protruded metal packing. The material was distilled through this column at a pressure of 4–15 mm. Hg. Small portions of the acetopropanol-phosphoric acid solution were added as distillation proceeded so as to keep the volume of liquid in the flask substantially constant. After all of the acetopropanol had been added, small portions of water (about 1% by weight of the flask contents) were added so that the residue in the flask was kept boiling vigorously. After thirteen hours of distillation, 166 g. of 4,5-dihydro-2-methylfuran, corresponding to a conversion of 84%, had been collected in the cooled receiver. The residue in the distillation flask was 31 g.

4,5-dihydro-2-methylfuran is useful as a chemical intermediate. Thus, it can be chlorinated to produce 2,3-dichlorotetrahydro-2-methylfuran in good yield as disclosed in my application S. N. 272,700, filed February 20, 1952, now Patent No. 2,678,319. This dichloro compound can then be reacted with thioformamide to obtain 4-methyl-5-($\beta$-hydroxyethyl)-thiazole as disclosed in U. S. P. 2,654,760 Londergan and Schmitz, issued October 6, 1953. The resulting thiazole is an important vitamin $B_1$ intermediate.

Wherever the term acetopropanol is used in this specification the compound is the same as gamma acetopropanol.

I claim:

1. The method of preparing 4,5-dihydro-2-methylfuran comprising distilling gamma acetopropanol containing a catalytically effective amount of a non-volatile acid selected from the group consisting of phosphoric acid, sulfuric acid, stearic acid, sodium hydrogen phosphate and sodium bisulfate, and collecting 4,5-dihydro-2-methylfuran and water as distillate while adding gamma acetopropanol to the body of liquid gamma acetopropanol undergoing distillation at such a rate that said body is maintained at a substantially constant volume during the course of the distillation.

2. The method of claim 1, wherein the gamma acetopropanol undergoing distillation contains a non-volatile acid in an amount not exceeding 0.5% by weight.

3. The method of claim 2, wherein the non-volatile acid content of the gamma acetopropanol undering distillation is within the range 0.01 to 0.05% by weight.

4. The method of claim 1, wherein the gamma acetopropanol fed to the liquid undergoing distillation contains a small amount of water, said water constituting between about 1% and 30% by weight of said liquid undergoing distillation.

References Cited in the file of this patent

UNITED STATES PATENTS

| | | |
|---|---|---|
| 2,251,292 | Reppe | Aug. 5, 1942 |
| 2,444,301 | Kyrides et al. | June 29, 1948 |

OTHER REFERENCES

Lipp: Berichte, vol. 22, pp. 1196–1205 (1899).
Schniepp et al.: J. A. C. S., 69, pp. 672–74 (1947).
Wohlgemuth: Annales de Chemie (9), 2, pp. 425–8 (1914).